(12) United States Patent
Medina, III et al.

(10) Patent No.: US 12,437,008 B1
(45) Date of Patent: Oct. 7, 2025

(54) RESOLVING LATENT STATUS FROM DENSE INFORMATION USING MACHINE LEARNING

(71) Applicant: UIPCO, LLC, San Antonio, TX (US)

(72) Inventors: Reynaldo Medina, III, San Antonio, TX (US); David Sokolowski, San Antonio, TX (US); James Warren Middleton, San Antonio, TX (US); Michael Martin Amati, Geneseo, NY (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/931,592

(22) Filed: Oct. 30, 2024

Related U.S. Application Data

(60) Provisional application No. 63/594,650, filed on Oct. 31, 2023.

(51) Int. Cl.
*G06F 16/93* (2019.01)
*G06Q 40/03* (2023.01)
(52) U.S. Cl.
CPC ............ *G06F 16/93* (2019.01); *G06Q 40/03* (2023.01)

(58) Field of Classification Search
CPC ............................... G06F 16/93; G06Q 40/03
See application file for complete search history.

(56) References Cited

U.S. PATENT DOCUMENTS

| 2020/0175267 A1* | 6/2020 | Schäfer | G06V 30/413 |
| 2023/0065915 A1* | 3/2023 | Berestovsky | G06V 30/1448 |

\* cited by examiner

*Primary Examiner* — Hau H Hoang
(74) *Attorney, Agent, or Firm* — Potomac Law Group, PLLC; Dannon G. Allbee

(57) ABSTRACT

Aspects of the present disclosure are directed to resolving a latent status of document(s) that contain dense information using machine learning. Documents can be organized as a set of informational pages that together convey data associated with an organizational concept. Resolving a latent status from the pages of documents comprising dense information can be challenging, for example when indicator(s) of this latent status are hidden within the dense information. Implementations predict the latent status of document(s) via machine learning by performing a feature extraction processing pipeline. For example, a feature extraction processing pipeline can reduce the dimensionality of the document data, thus providing the machine learning model(s) a simplified problem. The machine learning model(s) can process the extracted data and, given the simplified problem, accurately predict the latent status of the document(s). In some implementations, the machine learning model(s) are trained using real-world training instances and synthetic training instances.

20 Claims, 9 Drawing Sheets

*FIG. 4*

RESOLVING LATENT STATUS FROM DENSE INFORMATION USING MACHINE LEARNING

CROSS-REFERENCE TO RELATED APPLICATIONS

This application claims priority to U.S. Patent Application No. 63/594,650, filed on Oct. 31, 2023, titled "Resolving Latent Status From Dense Information Using Machine Learning" which is herein incorporated by reference in its entirety.

TECHNICAL FIELD

The present disclosure is directed to resolving a latent status of document(s) that contain dense information using machine learning.

BACKGROUND

Machine learning has become a highly effective tool for analyzing data and generating data predictions. However, machine learning is only as effective as the data that surrounds it. For example, training data and/or input data can have a significant impact on model performance. Some machine learning models, such as deep learning models, require voluminous data with specific proportions of training data diversity to be effective. However, this type of training data is not available in every scenario. In addition, deep learning models require a high degree of computational resources for training. At times, reducing the complexity and/or data dimensionality of the problem posed to machine learning models can result in improved performance and more efficient resource usage.

BRIEF DESCRIPTION OF THE DRAWINGS

FIG. 4 is a conceptual diagram illustrating an example document comprising dense information.

The techniques introduced here may be better understood by referring to the following Detailed Description in conjunction with the accompanying drawings, in which like reference numerals indicate identical or functionally similar elements.

DETAILED DESCRIPTION

Figure 1:
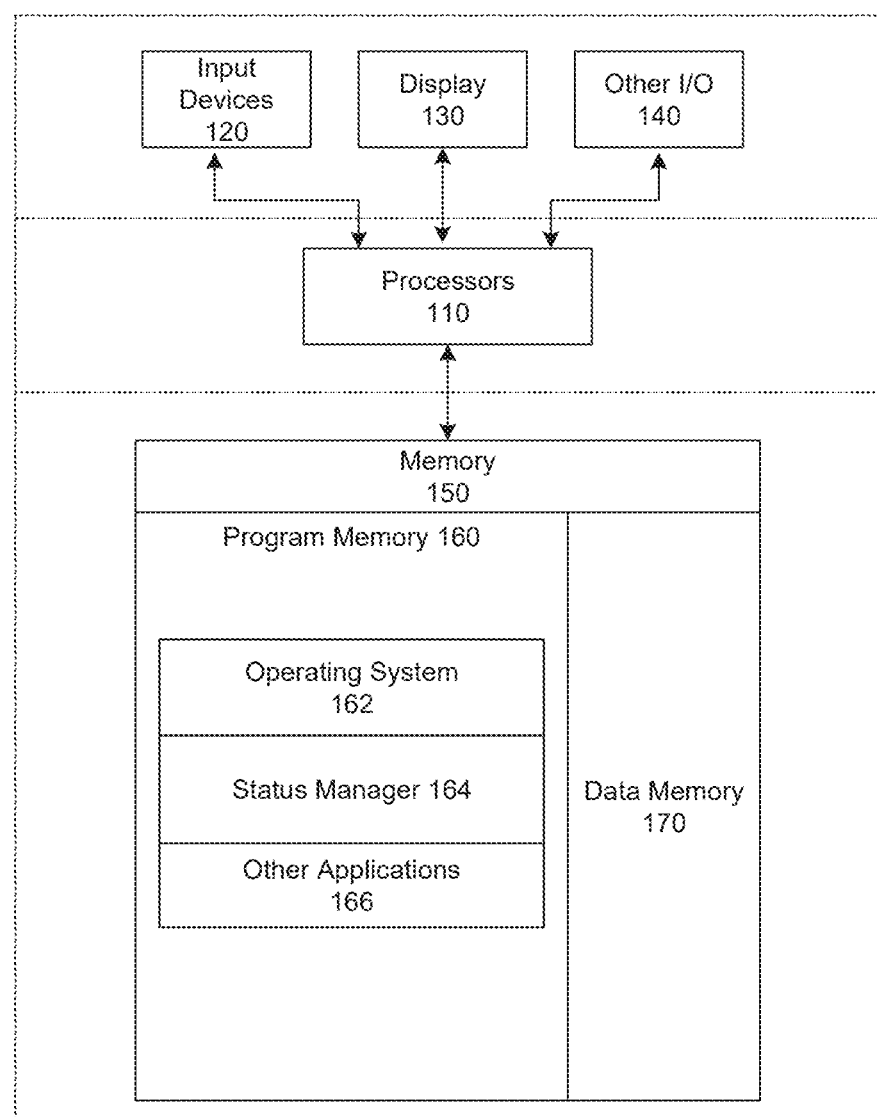
FIG. 1 is a block diagram illustrating an overview of devices on which some implementations can operate.

Aspects of the present disclosure are directed to resolving a latent status of document(s) that contain dense information using machine learning. Documents can be organized as a set of informational pages that together convey data associated with an organizational concept, such as the pages of an insurance document, logs of an online account, pages of a vehicle loan, and the like. In some scenarios, the pages of a document can be voluminous, and together these pages can comprise a high level of information density. Resolving a latent status from the pages of such documents can be challenging, for example when indicator(s) of this latent status are hidden within the dense information. Implementations predict the latent status of document(s) via machine learning by performing a feature extraction processing pipeline. For example, a feature extraction processing pipeline can reduce the dimensionality of the document data, thus providing the machine learning model(s) a simplified problem. The machine learning model(s) can process the extracted data and, given the simplified problem, accurately predict the latent status of the document(s).

In an example, vehicle loans can include a multitude of line items that cover several details, which can create a "needle in the haystack" problem when the status of a given aspect of the vehicle loan is hidden among the line items. Implementations of a status manager can match text from line items to target keywords, for example via a Levenshtein distance. For each match, the status manager can extract document features, such as numerical values associated with the matched keyword(s), coordinates (e.g., location on the document), the angle between numerical value(s) and matched key word(s), etc. In some implementations, machine learning model(s) can be trained using training data that comprises these extracted features and training labels.

In the vehicle loan example, the status manager may be interrogating the document(s) to discover the status of a detailed aspect of the vehicle loan, such as whether the loan includes gap insurance coverage, whether the loan is covered by a certain set of regulations, or any other suitable aspect of the vehicle loan that may be hidden in the density of the loan information. A training label within the training data can associate a particular status for the detailed aspect of the loan to its training instance (e.g., set of extracted features). For example, for a training instance that comprises matched key word(s) and a set of features extracted given the matched key word(s), the training label can indicate whether these matched key word(s) and extracted features positively indicate that the vehicle loan includes gap coverage or negatively indicate that the vehicle loan includes gap coverage. In some implementations, training data can be generated that includes a sufficient diversity of training labels (e.g., sufficient number of positive and negative training instances). In order to achieve this sufficient diversity, the training data can include synthetic data in some implementations, or training data generated by manipulating existing instances of training data to generate additional instances.

The machine learning model(s) can be trained using the generated training data, and the trained machine learning model(s) can predict the latent status of an unseen vehicle loan. For example, given a new vehicle loan (e.g., loan not included in the training data), the status manager can perform keyword matching. For matched key word(s), the status manager can extract document features with respect to the text matches, such as the associated numerical value(s), location coordinate(s), the angle between numerical value(s)

and matched text, etc. The status manager can feed the trained machine learning model(s) these extracted features as an instance of input. For each instance of input, the trained machine learning model(s) can predict a status of the given aspect of the auto loan (e.g., whether the auto loan includes gap coverage, any other latent status of the auto loan). In some implementations, the status manager can combine the predicted statuses given the instances of input to determine an overall status for the document(s) (e.g., vehicle loan).

Traditional machine learning implementations can suffer significant drawbacks. For example, deep learning models often require voluminous training data with sufficient proportions of training labels to be effective. In addition, deep learning models consume large quantities of computational resources for training, which makes updating models or training new models impractical. While some non-deep learning models can mitigate these drawbacks, the data problems posed to these simpler models in conventional settings is often limited due to their simplicity.

Implementations reduce the complexity of a machine learning problem by reducing the dimensionality of data posed to machine learning model(s) to achieve an efficient solution that is effective in the presence of limited training data. For example, in a conventional machine learning setting, document processing may be performed by a computer vision model, such as a convolutional neural network. However, training data may not be available to train such a computer vision model to perform the desired task. Implementations perform a data processing pipeline that reduces the dimensionality of a computer vision task so that a simpler model (e.g., decision tree) can effectively perform the task. This reduced dimensionality enables these simpler model(s) to effectively perform with limited training data. The simpler models also consume fewer computational resources when compared to computer vision models, which achieves an improvement to the computing device(s) that implement the model(s).

Several implementations are discussed below in more detail in reference to the figures. FIG. 1 is a block diagram illustrating an overview of devices on which some implementations of the disclosed technology can operate. The devices can comprise hardware components of a device 100 that resolve a latent status of document(s) that contain dense information using machine learning. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, status manager 164, and other application programs 166. Memory 150 can also include data memory 170, e.g., issue template(s) (e.g., key word(s), etc.), training data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
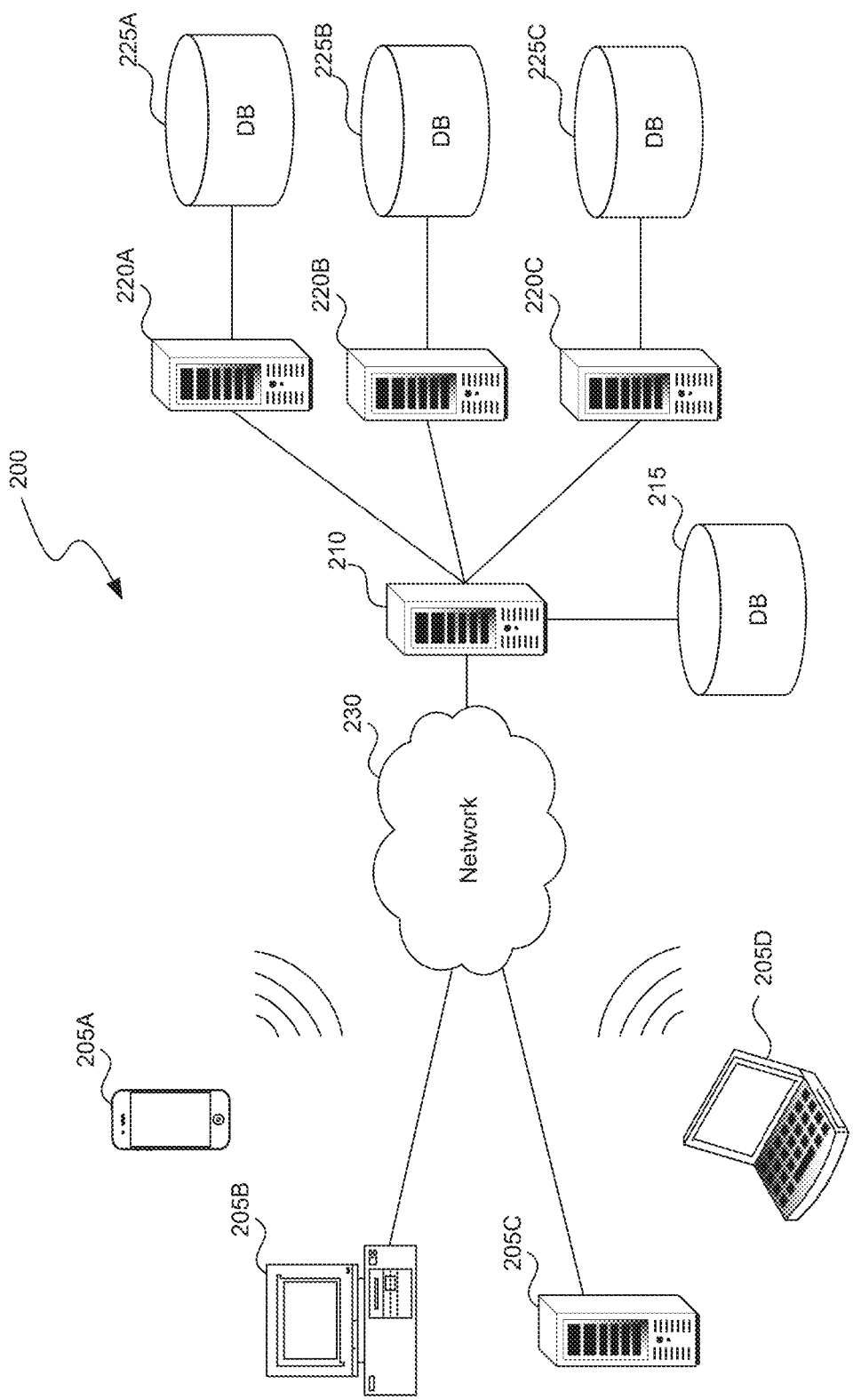
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as issue template(s) (e.g., key word(s), etc.), training data, document(s) comprising dense information, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
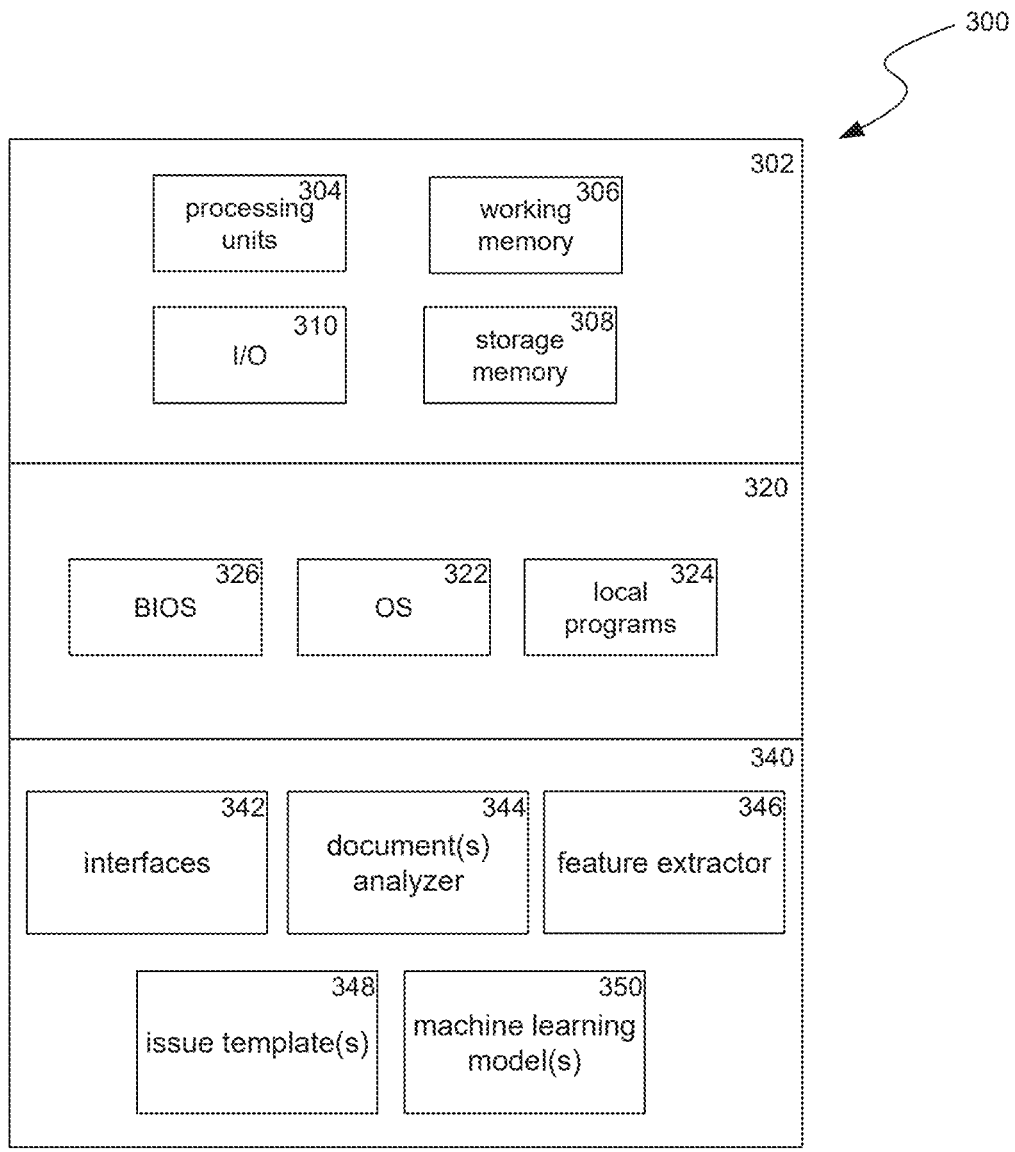
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include document(s) analyzer 344, feature extractor 346, issue template(s) 348, machine learning model(s) 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Document(s) analyzer 344 can process document(s) for feature extractor 346. For example, document(s) analyzer 344 can perform optical character recognition (OCR) on pages of documents to decipher characters. In some implementations, document(s) analyzer 344 can analyze images (e.g., .jpg, .png, etc.), formatted documents (e.g., portable document format (.pdf) documents), or any other suitable documents. Document(s) analyzer 344 may enhance documents prior to processing, such as when document quality (e.g., image quality, etc.) is below a threshold for accurate OCR. In some implementations, document(s) analyzer 344 compares text from the processed document(s) to issue template(s) 348 to detect matching text, and provides the matching text to feature extractor 346 for further feature extraction. Descriptions with reference to blocks 902 and 904 of FIG. 9 further describe the functionality of document(s) analyzer 344.

Feature extractor 346 can extract features from document(s) for input to machine learning model(s) 350. For example, document(s) analyzer 344 can detect text from one or more document(s) that match issue template(s) 348. For a given instance of matching text, feature extractor 346 can extract features related to the matching text. Example features include: a confidence level for the match with issue template(s) 348 (e.g., confidence for a match with a list of keywords), a page location for the matching text (e.g., coordinates), one or more numerical values associated with the matching text, angles and/or distances between the matching text and associated numerical values, a length of the matching text and/or numerical values (e.g., pixel length, character length, string length, etc.), whether the matching text is capitalized or in lowercase, other suitable features related to the matching text with respect to the surrounding context of the page on which the matching text is located, and any other features. Descriptions with reference to block 906 of FIG. 9 further describe the functionality of feature extractor 346.

Issue template(s) 348 can define template(s) for particular issues that are used to detect when a document's text is relevant to the particular issues. An example of issue template(s) 348 is a list of keywords that are related to a particular issue or topic. Document(s) analyzer 344 can compare such a list of keywords to the text of document(s) to identify document text that matches a given one of issue template(s) 348. An example issue can be whether an auto insurance loan include gap insurance coverage, and a corresponding one of issue template(s) 348 for this issue can be a list of key words related to gap insurance coverage (e.g., gap, cancellation, debt, agreement, debt cancellation, cancellation option, cancellation agreement, deb cancellation agreement, etc.). Descriptions with reference to block 904 of FIG. 9 further describe the functionality of issue template(s) 348.

Machine learning model(s) 350 are model(s) that can train on low-dimensionality data to predict a status related to an issue (e.g., an issue related to issue template(s) 348). An example of machine learning model(s) 350 is a decision tree, such as a random forest model, a gradient boosted tree, genetic tree model, or any other decision tree. Machine learning model(s) 350 can be any other suitable machine learning model(s) that efficiently learn from low-dimensionality data. Machine learning model(s) 350 can be trained using training instances (e.g., real-world instances from document(s), synthetic training instances, etc.) comprising features and training labels. Once trained, machine learning model(s) 350 can predict a latent status of new document(s) that contain dense information. For example, document(s) analyzer 344 can process the new document(s) and feature extractor 346 can extract features based on the results of document(s) analyzer 344. This processing and feature extraction can generate input instances for machine learning model(s) 350. The input instance(s) can be fed to machine learning model(s) 350, and for each input instance the model(s) can generate a prediction about the latent status (e.g., positive indication, negative indication, or any other suitable category prediction). For example, the prediction may be that the input instance indicates a loan includes a certain type of coverage, online activity logs include a certain kind of user activity, or any other suitable prediction for the status of document(s). Descriptions with reference to blocks 802, 804, 806, and 808 of FIG. 8 and block 908 of FIG. 9 further describe the functionality of machine learning model(s) 350.

Figure 4:
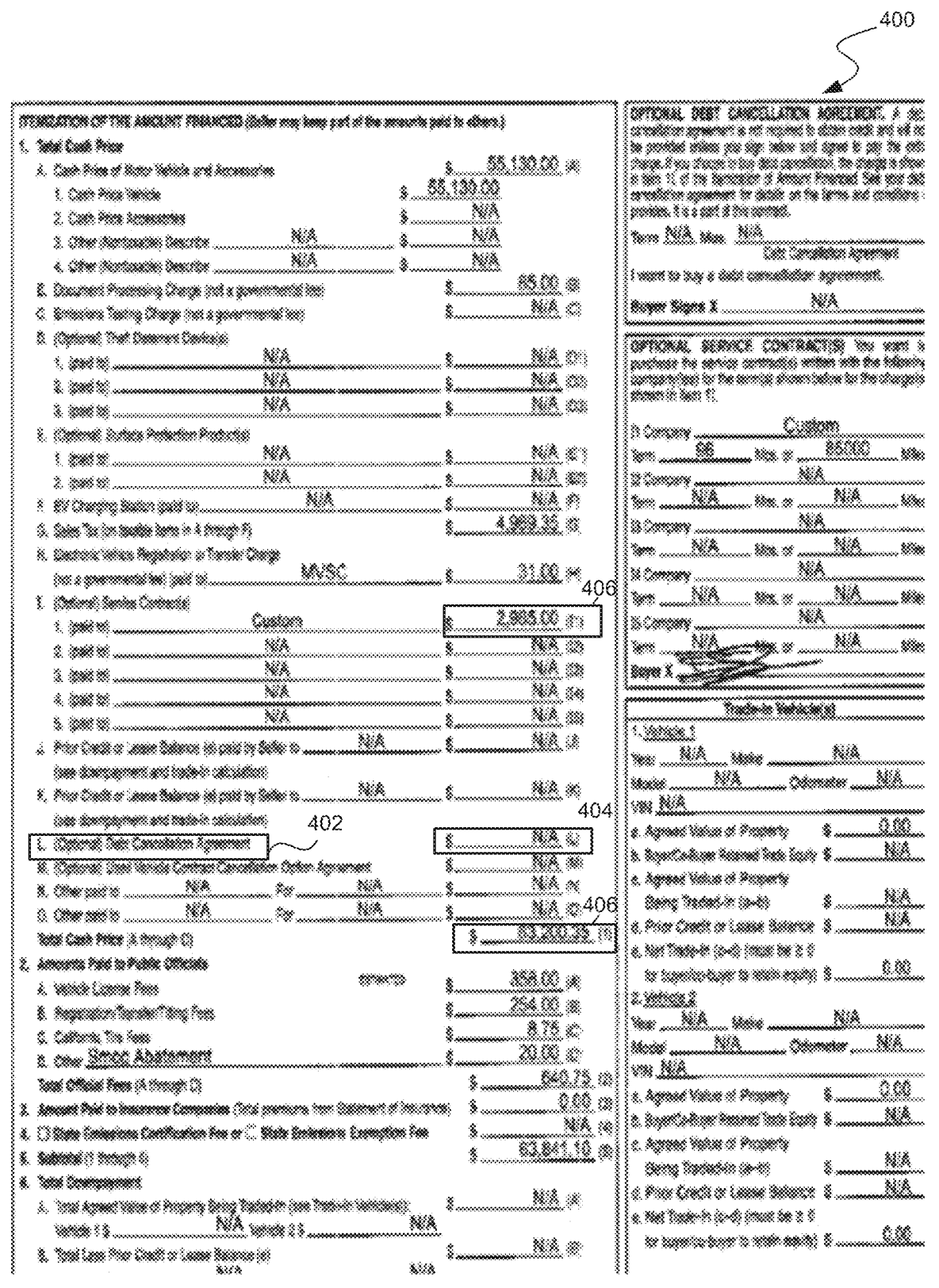

Implementations predict a latent status of document(s) that contain dense information using machine learning. FIG. 4 is a conceptual diagram illustrating an example document comprising dense information. Document page 400 includes text 402, element 404, and numerical values 406. Document page 400 can be a page of a multipage document, such as a vehicle auto loan document. As depicted, document page 400 includes several line items of information. The additional pages of the vehicle auto loan (not depicted) also contain several line items of information. Accordingly, the vehicle auto loan document comprises a high degree of information density.

The line items of document page 400 include text. For example, text 402 reads "Debt Cancellation Agreement". From visually inspecting document page 400, it can be seen that text 402 is associated with the dollar amount 'N/A', which is listed at element 404. In order to determine whether the vehicle loan that document page 400 comes from includes gap insurance coverage, text 402 can be visually inspected by a person to identify that element 404 reads 'N/A', indicating that the vehicle loan does not include gap insurance. However, in order to visually inspect this line item, the person may be required to read through the dense information of the vehicle loan until reaching a line item that indicates gap insurance (e.g., text 402). Because very few lines (e.g., zero, one, two, five, etc.) of the vehicle loan relate to gap insurance, the person is posed with a "needle in the haystack" problem to find the portion of the document relevant to gap insurance.

Implementations can process the vehicle loan document and predict whether it includes gap insurance using trained machine learning model(s). For example, a document(s) analyzer can resolve the text in document page 400 using OCR, and compare text from document page 400 to an issue template defined for the gap insurance coverage issue. In some implementations, the issue template can be a list of keywords related to gap insurance, such as gap, cancellation, debt, agreement, debt cancellation, cancellation option, cancellation agreement, deb cancellation agreement, etc.

The document(s) analyzer can compare the list of keywords to the text from document page 400 to find matching text. In some implementations, the text can be matched according to a Levenshtein distance, or the number of character changes between the matching text and the keyword(s). For example, the Levenshtein distance is one between 'cat' and 'hat' and two between 'chart' and 'chalk'. When the matching text and keywords require no character changes, the distance is zero. Text from document page 400 within a threshold Levenshtein distance from one or more keyword(s) (e.g., two, three, five, less than 10% of the total length of the keyword(s), less than 20% of the total length of the keywords, etc.) can be determined as matching text.

Text 402 is an example of matching text since "Debt Cancellation Agreement" matches keywords from the example list of keywords. Other suitable text from document page 400 may similarly match keywords. The entirety of the document(s) can contain a number of matches between text and keywords.

Figure 5:
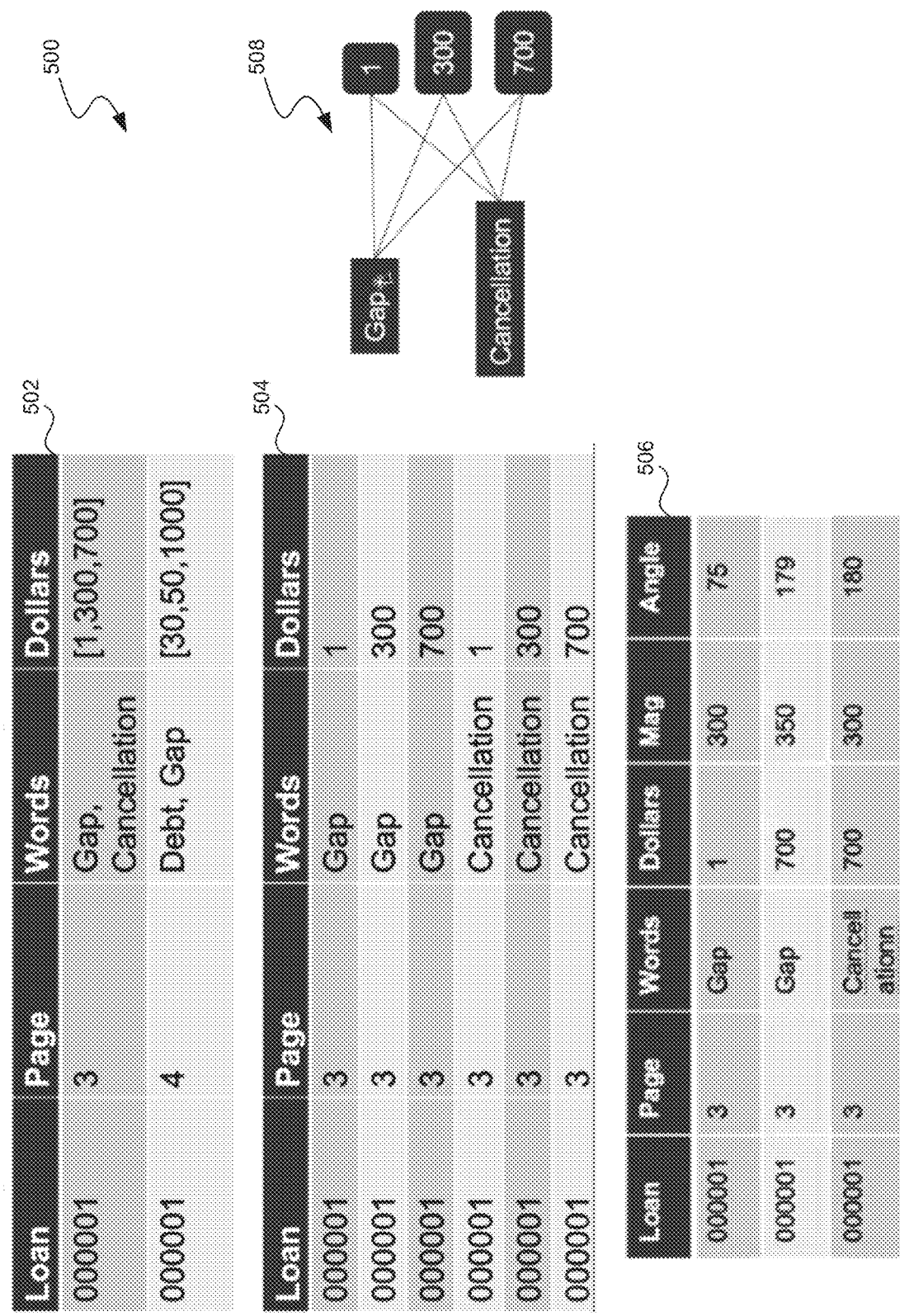
FIG. 5 is a conceptual diagram illustrating example features extracted from document(s).

Once matching text is determined, a feature extractor can extract features related to the matching text and/or the context of document page 400. FIG. 5 is a conceptual diagram illustrating example features extracted from document(s). Diagram 500 includes tables 502, 504, and 506, as well as associations 508. The data from table 502 represents matching text and associated numerical values. For example, the words 'gap' and 'cancellation' are associated with '1', '300', and '700' in the illustrated example, as visually depicted by associations 508.

In some implementations, an instance of matching text can be associated with numerical values present on the same page of the document(s). In another example, an instance of matching text can be associated with numerical values present on the same page of the document(s) that are withing a threshold distance metric and/or at a threshold angle. For example, the coordinates of matching text and numerical values can be determined via any suitable OCR tool and analytics software. In some implementations, the coordinates can be regular coordinates that comprise an x-value and y-value, and a distance between matching text and numerical values can be determined. In some implementations, the coordinates can be polar coordinates that comprise an angle and a magnitude (e.g., from a reference point), and the polar coordinates can be compared to determine the distance and/or angle.

The first row of table 502 shows that matching words 'gap' and 'cancellation' are associated with '1', '300', and '700'. This data can be flattened to reduce its dimensionality, reduce the complexity of the problem posed to machine learning model(s), and improve performance. Table 504 flattens the data such that each row of the table relates to a word and numerical value combination from the first row of table 502. The flattened data can then be augmented with extracted features, as illustrated in table 506. For example, a feature extractor can extract features for matching words, such as distances to associated numerical values, angles to associated numerical values, and many more. In some implementations, the features extracted for matching words relate to the context of the matching words on the page of the document(s) at which the matching words are located. Example features include at least a portion of:

- Angular distance between matching text and associated numerical value (e.g., using angle of polar coordinates)
- Numerical value as a string length—character count
- Distance between text and associated numerical value (e.g., using magnitude of polar coordinates).
- Delta Y—delta in pixels from the targeted word to the associated numerical value
- Delta X—delta in pixels from the targeted word to the associated numerical value
- Numerical value width in pixels
- Numerical value height in pixels
- Match confidence, such as based on Levenshtein distance for the match between the keyword(s) and the matching text (e.g., percentage of word correct, binning into confidence bins based on distance number, such as 1-90%, 2-80%, etc.).
- Target word category (e.g., given categories for keywords)

Value range bin for the associated numerical value (e.g., 0-100, 100-500, 500-1000, 1000-1500, 1500-2000, 2000-2500, 2500-3000, 3000+)

Keyword width in pixels

Readtext length in characters

Is read text lowercase—true or false

Keyword height—in pixels

Numerical value read (e.g., from OCR) vs Numerical value as a string (e.g., number of differences between the characters of these two versions of the numerical value).

For example, table 506 can store extracted features for each row of the table. The disclosed document(s) processing and feature extraction can be referred to as an extraction pipeline. Such an extraction pipeline reduces the dimensionality of a conventional computer vision problem into a less complex and more efficient machine learning problem. For example, the format of input data and training data for implemented machine learning model(s) can comprise portion(s) of matching text and features extracted by the feature extraction pipeline. When compared to image(s) of the entire document page(s), this input data and training data can be processed with simpler models that can be trained efficiently.

Figure 6:
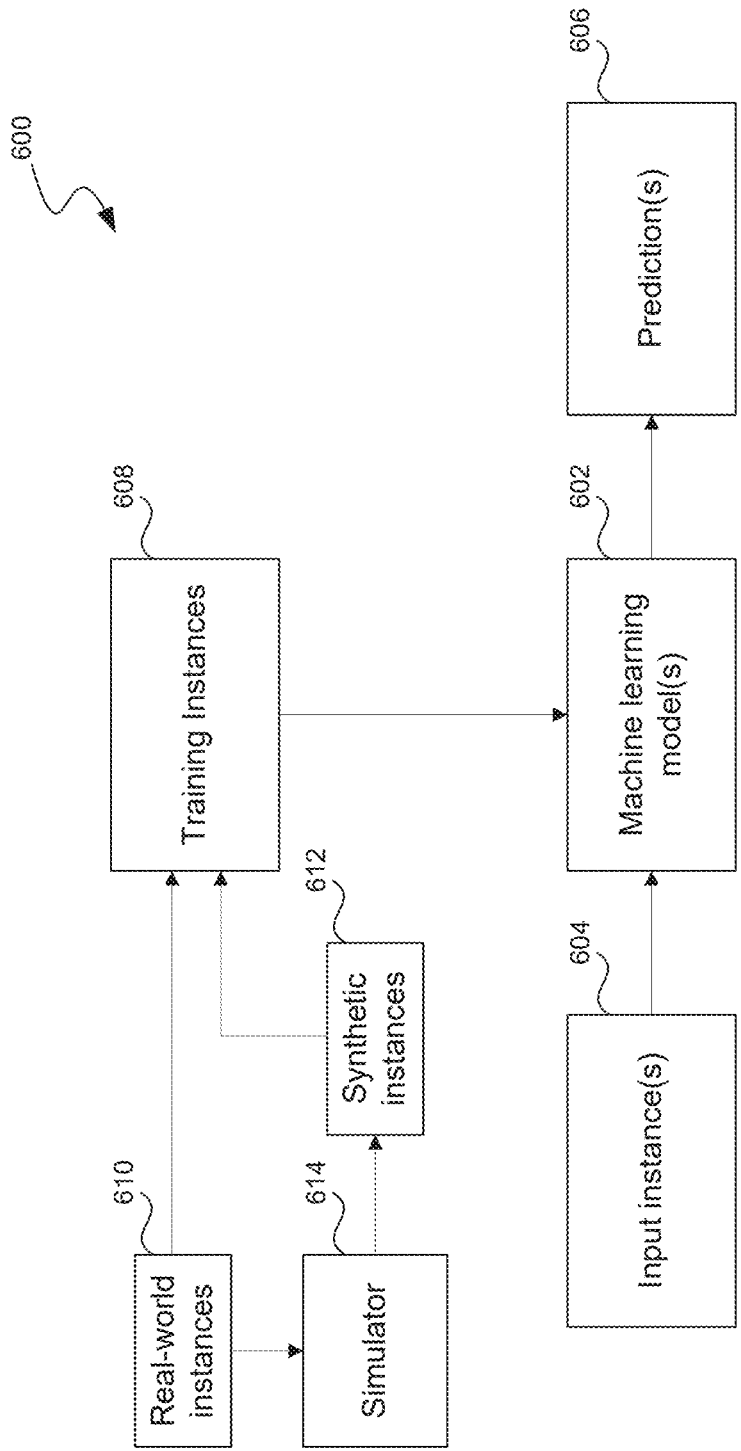
FIG. 6 is a diagram of example machine learning model(s), training data, and prediction(s).

FIG. 6 is a diagram of example machine learning model(s), training data, and prediction(s). Diagram 600 includes machine learning model(s) 602, input instance(s) 604, prediction(s) 606, training instance(s) 608, real-world instance(s) 610, synthetic instance(s) 612, and simulator 614. Once trained, input instance(s) 604 (e.g., at least portions of matching text and extracted features for the matching text) can be fed to machine learning model(s) 602 to generate prediction(s) 606. Training instances 608 can train machine learning model(s) 602 to generate prediction(s) 606 using input instance(s) 604.

Training instances 608 can be formatted similar to input instance(s) 604 (e.g., at least portions of matching text and extracted features for the matching text), but also include a training label (e.g., '1' or '0', numerical value assigned to a specific category, etc.). In the gap insurance example, a '1' label can indicate that the training instance is indicative of a positive for gap insurance coverage and a '0' label can indicate that the training instance is not indicative of a positive for gap insurance coverage (e.g., is indicative of a negative for gap insurance coverage). Training instances 608 can include several instances with a '1' training label and several instances with a '0' training label. Any other suitable issue category can be implemented with corresponding training labels.

In some implementations, training instances 608 can comprise real-world instances 610 and synthetic instances 612. For example, effective machine learning often relies on the training data that includes a sufficient number of instances with a given training label. In the gap insurance coverage example, real-world instances 610 that are indicative of a positive for gap insurance coverage can be limited. For example, real-world instances 610 can comprise matching text and extracted features (as disclosed with reference to FIGS. 4 and 5) from real-world vehicle insurance document(s). However, real-world vehicle insurance document(s) that include gap insurance coverage can be limited in number. Implementations can generate synthetic data from the few real-world instances 610 that are indicative of a positive for gap insurance coverage such that the entirety of training instances 608 include enough '1' training labels for effective performance.

Simulator 614 can alter real-world instances 610 that comprise a '1' training label to generate synthetic instances 612 with a '1' training label. Any other suitable synthetic instances 612 can be generated. The alterations can include altering the extracted features, such as increasing or decreasing the magnitude and/or angle between matching text and associated numerical values, increasing or decreasing a match confidence, and the like. In some examples, simulator 614 can alter formatted real-world instances 610 (e.g., flattened low dimensionality data) to generate synthetic instances 612. In another example, simulator 614 can visually alter the page(s) of the document(s) that correspond to the real-world instances 610 comprising a '1' training label such that the extraction pipeline can generate synthetic instances 612 using the visually altered page(s) of the document(s). For example, alterations to page(s) of document(s) can include increasing noise, altering scale, altering skew, changing font size, or any other suitable image processing technique.

In some implementations, training instances 608 that comprise real-world instances 610 and synthetic instances 612 can comprise a sufficient diversity of training labels such that machine learning model(s) 602 can effectively generate prediction(s) 606 once trained. Machine learning model(s) 602 can comprise models that can train and generate predictions with a relatively small set of training instances 608, such as non-deep learning models. For example, machine learning model(s) 602 can be decision tree(s), such as a random forest model, gradient boosted tree(s) (e.g., XGBoost), genetic tree model, or any other decision tree(s). In some implementations, machine learning model(s) 602 combine output from several weak learners to generate strong ensemble predictions.

In some implementations, training instances 608 can comprise thousands of training instances, where the ratio can be: about 1000 instances of a given training label (e.g., '0' label) to about 25 instances of another given training label (e.g., '1' label). Because the implemented machine learning model(s) 602 can effectively learn from a relatively small set of training instances 608, this diversity is sufficient to achieve model performance. Any other suitable number of training instances 608 and ratio of training labels can be implemented.

Training instances 608 can train machine learning model(s) 602 via supervised learning. For example, decision tree(s) can train on training instances 608 to configure the parameters of the tree(s). Because machine learning model(s) 602 are relatively simple model(s) (e.g., non-deep learning models), training and/or retraining can be computationally efficient.

In the gap insurance coverage example, prediction(s) 606 generated by trained machine learning model(s) 602 can comprise predictions about whether a given input instance (e.g., matching text and extracted features) is indicative that the document(s) that contain the given input instance include gap insurance coverage. In some implementations, prediction(s) 606 generated using matching text from the page(s) of a given document (e.g., a given vehicle loan) can be combined to predict whether the document as a whole includes gap insurance coverage. In some examples, one or more prediction(s) 606 that a given one or more of input instance(s) 604 is indicative of coverage can be sufficient to resolve that the entire document(s) include gap insurance coverage. Any other suitable techniques can be used to combine prediction(s) 606 to resolve a status for the entire document(s).

In an example, a new vehicle insurance loan document (e.g., multipage document) can be received and processed to determine whether the new document includes gap insurance coverage. In some implementations, many new loans can be received over a window of time such that the loans are queued for processing. One or more of the prediction(s) generated by implementations (e.g., prediction(s) 606 from FIG. 6) can be stored and accessed at a later date (e.g., to perform an audit, comply with regulatory requirements, identify data trends, etc.). For example, each new loan processed can be associated with stored prediction(s). In some implementations, a subset of the stored loans and prediction(s) can be accessed for data mining and trend identification.

In some implementations, the gap insurance predictions can be used to determine funding for a given loan. For example, a new vehicle loan that is a candidate for funding can be received and processed to determine whether the loan includes gap insurance coverage prior to funding the new loan. Loans flagged with gap insurance coverage can be queued for manual review before funding or can be explicitly rejected. In some implementations, a rejection can be accompanied by a message, such as loan rejected due to gap insurance coverage.

Any other suitable issue types and/or document(s) can be processed to predict the status of issue type(s) with respect to the document(s). For example, online log data can include dense information representative of a user's online activity. It may be burdensome for a person to detect a certain user activity hidden in the logs. Implementations can match certain strings and/or text to log entries of interest, for example via keyword matching. Similarly, features for each match can be generated, such as the proximity (e.g., distance, angle, etc.) to other portions of the log indicative of actions (e.g., user clicking a button, etc.). Machine learning model(s) can be trained with positive and negative instances of the issue type (e.g., log entries/features that positively indicate the specific user action and log entries/features that negatively indicate the specific user action). The machine learning model(s) can then predict whether the user logs indicate that the user has performed a specific online activity.

Other suitable documents can include insurance documents, loans, other financial documents, or any other suitable document that comprises dense information. The issue type for these documents can relate to specific issues relevant to the particular documents, such as whether an insurance policy includes a certain provision, whether a loan is covered by a certain regulation, and the like. Similar to the vehicle loan example, the document pages can be processed to determine matches with an issue template (e.g., keywords) and features can be extracted for the matches. One or more machine learning models can be trained using relevant training data instances, and the trained machine learning model(s) can be used to predict the status of the particular issue with respect to the pages of the document(s).

Figure 7:
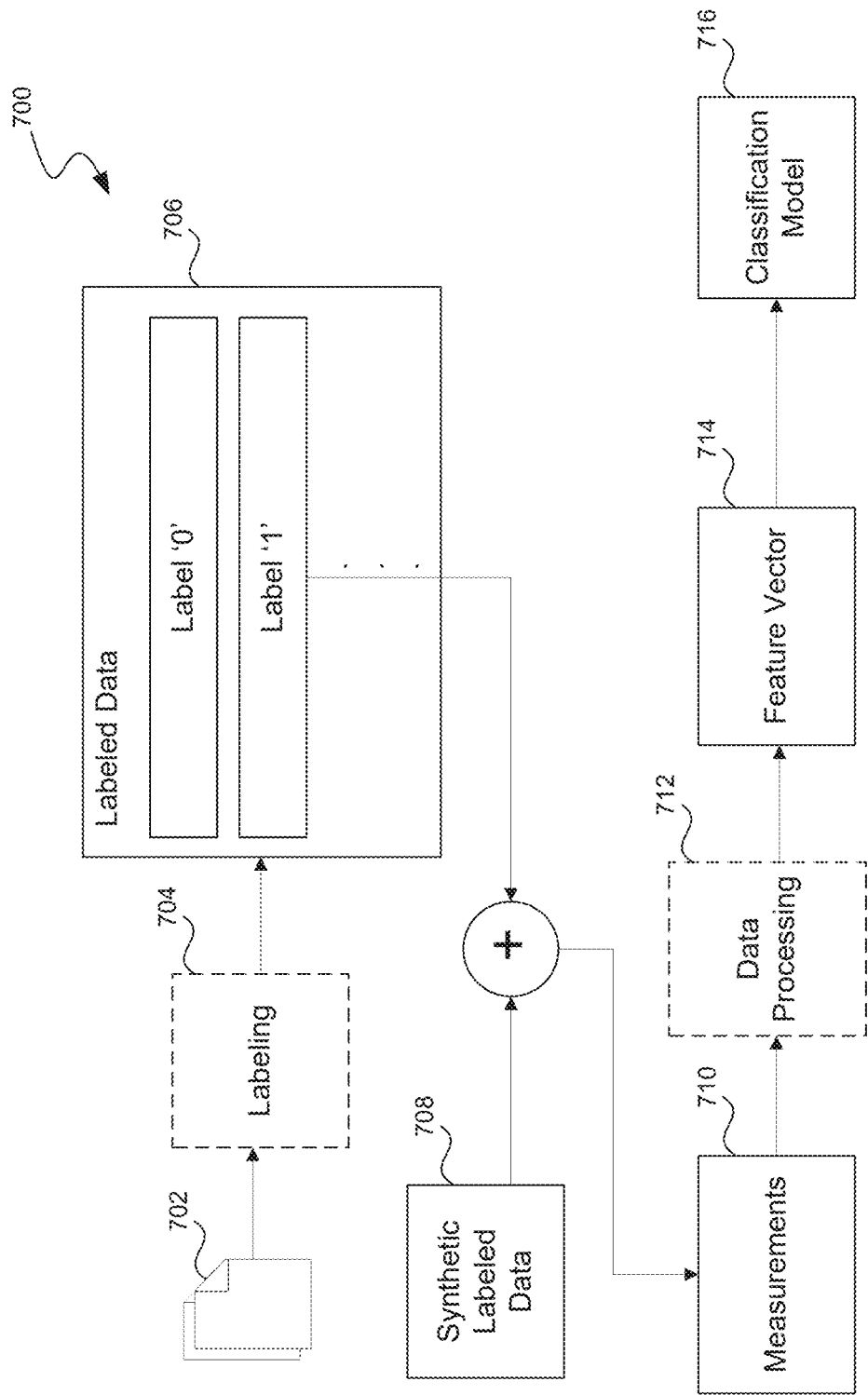
FIG. 7 is a conceptual diagram illustrating hash(es) of document page(s) for classifying a candidate document page.

FIG. 7 is a conceptual diagram illustrating a workflow for configuring a classification model. Diagram 700 illustrates example components and a workflow for configuring and/or training a classification model that can predict a latent classification with respect to one or more pages of document(s). Diagram 700 includes documents 702, labeling 704, labeled data 706, synthetic labeled data 708, measurements 710, data processing 712, feature vector 714, and classification model 716.

Documents 702 can comprise any suitable document(s) related to a latent issue, such as loan documents related to a coverage option (e.g., gap insurance), or any other suitable documents related to any other suitable issue. For example, the contents of documents 702 can indicate classifications with respect to the issue (e.g., whether or not a given loan includes gap insurance coverage), however determining the classifications may pose a challenge due to the time the task may take for a person and/or the complexity of the task for a computer. Classification model 716 can be configured and/or trained to reliably and efficiently predict classifications in such scenarios.

Labeling 704 can label portions of documents 702 to generate labeled data 706. Labeled data 706 can include two classification labels, (e.g., includes gap coverage and does not include gap coverage), three classification labels, or many more. In some implementations, the availability of labeled data 706 can be limited. Synthetic labeled data 708 can be used to augment labeled data 706. For example, labeled data 706 can be similar to real-world instances 610 of FIG. 6 and synthetic labeled data 708 can be similar to synthetic instances 612 of FIG. 6. Measurements 710 can be determined from labeled data 706 and synthetic labeled data 708. Example measurements 710 can include numerical measurements between word values (e.g., keywords) and numerical values (e.g., dollar amounts), or any other suitable measurements.

Data processing 712 can process measurements 710, labeled data 706, and/or synthetic labeled data 708 to generate feature vector 714. In some implementations, measurements 710 can be flattened and additional features can be extracted, such as additional features for word value and numeric value pairings. Descriptions with respect to FIG. 5 further describe the functionality of data processing 712, such as data flattening and feature extraction. The data of feature vector 714 can then configure classification model 716 to predict one or more classifications for pages of document(s). An example of classification model 716 is machine learning model(s) 602 of FIG. 6 as trained via training instances 608.

Those skilled in the art will appreciate that the components illustrated in FIGS. 1-5, 6A, 6B, and 7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 8:
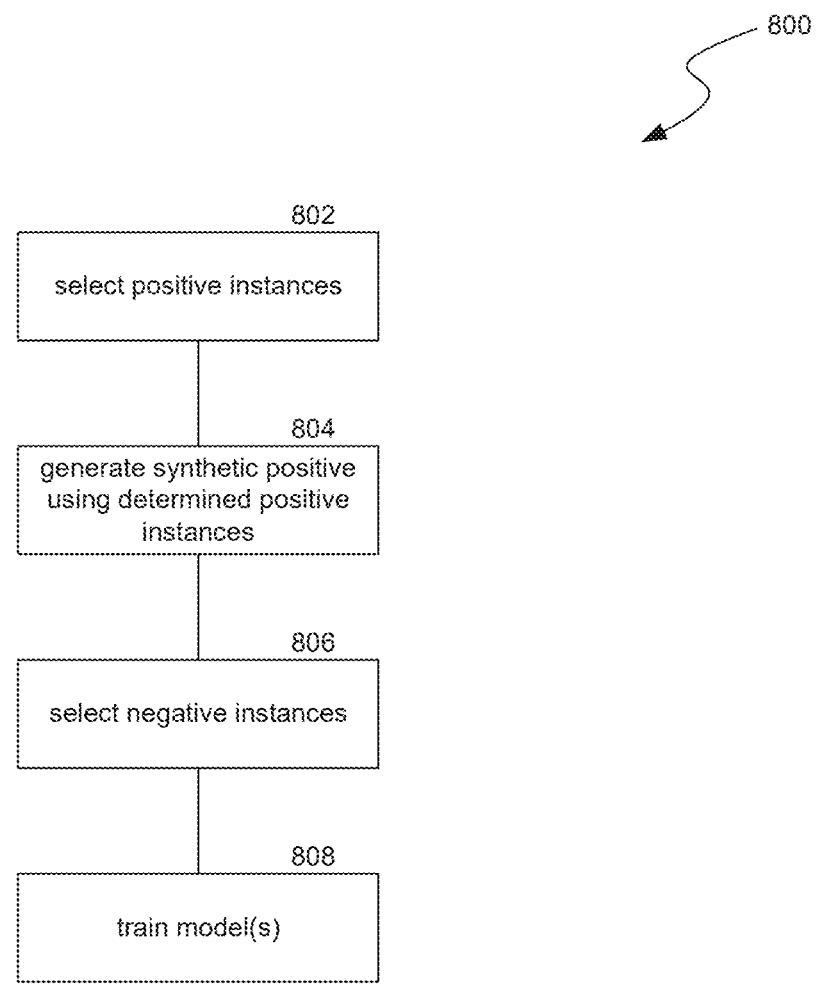
FIG. 8 is a flow diagram illustrating a process used in some implementations for generating synthetic training data and training machine learning model(s).

FIG. 8 is a flow diagram illustrating a process used in some implementations for generating synthetic training data and training machine learning model(s). Process 800 can be performed in advance of process 900 of FIG. 9 to generate trained machine learning model(s) for resolving a latent status of document(s) that contain dense information. Process 800 can be triggered when one or more datasets that comprise training document(s) are received or accessed. Process 800 can be performed by any suitable computing device(s) (e.g., cloud device(s), server(s), edge device(s), laptop(s), desktop(s), or any other suitable computing device(s)).

At block 802, process 800 can select positive instances of training data from a dataset. For example, training instances can be generated from real-world document(s) by performing a feature extraction pipeline on the pages of the document(s). The training instances can include a variety of data labels, such as '0' and '1'. In some implementations, the number of a given data label may be insufficient for machine learning, for example because a limited number of real-world document(s) are available that correspond to this given data label. For example, the number of training instances with a '0' label may be sufficient, but the number with a '1' label may be insufficient. Accordingly, the training instances with a '1' data label (e.g., positive instances) can be selected for synthetic data generation.

At block 804, process 800 can generate synthetic training instances using the positive instances of training data from the dataset. For example, the positive training instances can be altered to generate synthetic training instances and increase the overall number of training instances with a '1' data label. The alterations can include altering the extracted features of training instances, such as increasing or decreasing the magnitude and/or angle between matching text and associated numerical values, increasing or decreasing a match confidence, and the like. In some examples, the formatted training instances (e.g., flattened low dimensionality data) can be altered to generate the synthetic training instances. In another example, the page(s) of the document(s) that correspond to the positive training instances can be altered, and a feature extraction pipeline can be used to generate the synthetic training instances using the altered page(s) of the document(s). For example, alterations to page(s) of document(s) can include increasing noise, altering scale, altering skew, changing font size, or any other suitable image processing technique.

At block 806, process 800 can select negative instances of training data from the dataset. For example, a number of negative training instances can be selected that maintains a given ratio of data labels among the training instances for effective machine learning performance. In some implementations, negative training instances can be compared to the limited number of positive training instances, and negative training instances can be selected that are dissimilar from the positive training instances (e.g., that comprise a similarity below a threshold). Such selection can increase the signal present in the training data and improve machine learning performance.

At block 808, process 800 can train the machine learning model(s) using the positive and negative instances of training data. For example, the machine learning model(s) (e.g., decision tree, such as gradient boosted tree) can be trained via supervised learning using the training data.

Figure 9:
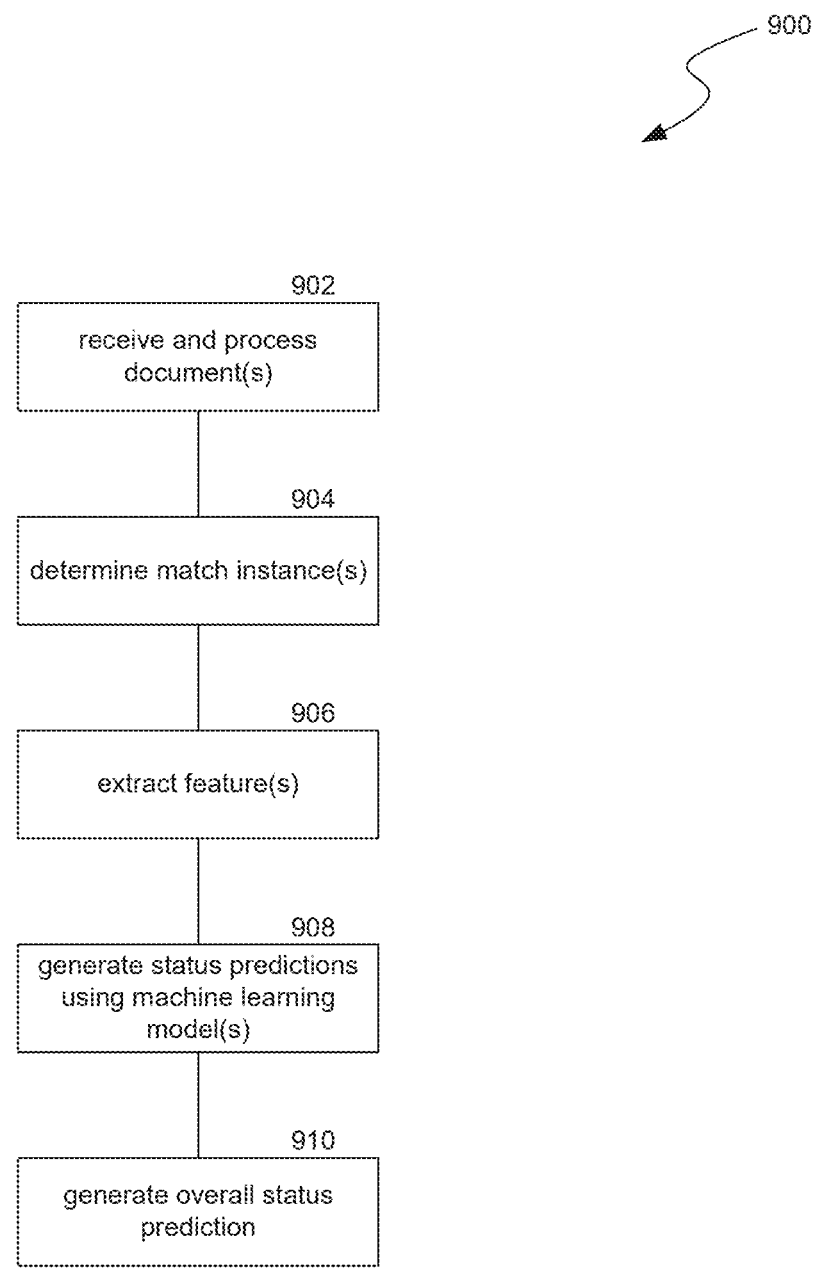
FIG. 9 is a flow diagram illustrating a process used in some implementations for resolving a latent status of document(s) that contain dense information using machine learning.

FIG. 9 is a flow diagram illustrating a process used in some implementations for resolving a latent status of document(s) that contain dense information using machine learning. Process 900 can be triggered in response to receiving document(s) that comprise dense information for latent status prediction. Process 900 can be performed by any suitable computing device(s) (e.g., cloud device(s), server(s), edge device(s), laptop(s), desktop(s), or any other suitable computing device(s)).

At block 902, process 900 can receive and process document(s). For example, one or more documents comprising a plurality of line items can be received, where the document(s) are organized into pages. The document(s) can comprise online activity log(s), financial document(s), insurance document(s), vehicle loan document(s), or any other suitable document(s) comprising dense information.

At block 904, process 900 can determine match instances between text from a subset of the line items and text descriptive of an issue category. For example, OCR can be performed on the page(s) of the document(s), and the text from the page(s) can be compared to keywords related to an issue category. In some implementations, the issue category can be gap insurance coverage, and example keywords include gap, cancellation, debt, agreement, debt cancellation, cancellation option, cancellation agreement, deb cancellation agreement, etc. In some implementations, the comparison can determine the Levenshtein distance between keyword(s) and the text form the page(s), and a distance below a threshold can be identified as matching text.

At block 906, process 900 can extract, for each of the match instances, features. For example, a feature extraction pipeline can be executed for each match instance that extracts features related to the match instance with respect to the page of the document on which the matching text for the match instance is located. At least a portion of the extracted features can include symbols associated with the matching text, or numerical values present on the same page as the matching text. In some implementations, extracted features can include one or more distance and/or angle measurements with respect to: a) a location of the matched text of the match instance with respect to a corresponding page of the one or more documents, and b) a location of symbols associated with the matched text with respect to the corresponding page of the one or more documents. For example, the extracted measurements can be one or more angles with respect to a) a location of the matched text of the match instances on the corresponding page of the one or more documents, and b) a location of one or more of the numerical values associated with the matched text on the corresponding page of the one or more documents. Any other suitable features can be extracted with respect to the matching text of a match instance and the page of the document(s) on which the matching text is located.

At block 908, process 900 can generate status predictions for the issue category by inputting, to one or more trained machine learning models, instances of input that correspond to the match instances. The trained machine learning model(s) can comprise decision tree(s) (e.g., gradient boosted tree(s)) trained via supervised learning. For example, the machine learning model(s) can be trained using real-world training instances comprising extracted features from one or more training documents and synthetic training instances. The real-world training instances and synthetic training instances can comprise data labels for the supervised learning.

In some implementations, each instance of input can include a portion of the matched text from the match instances, distance and/or angle measurements extracted between the matched text and one or more of the associated symbols (e.g., numerical values), and one or more indicators representative of symbols associated with the matched text (e.g., numerical values). For example, the numerical values can be binned, and the indicator(s) can represent the bin(s) for the numerical value(s).

At block 910, process 900 can analyze the status predictions to generate an overall status prediction for the issue category. For example, one or more status predictions that a given one or more of input instances is indicative of coverage can be sufficient to resolve that the entire document(s) include gap insurance coverage. Any other suitable techniques can be used to combine status predictions to resolve an overall status prediction for the entire document(s).

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for resolving a latent status of one or more documents, that contain dense information, using machine learning, the method comprising:
   receiving one or more documents comprising a plurality of line items, wherein the one or more documents are organized into pages;
   determining match instances between text from a subset of the line items and text descriptive of an issue category;
   extracting, for each of the match instances, one or more distance and/or angle measurements between: a) a location of the matched text of the match instance on a corresponding page of the one or more documents, and b) a location of symbols associated with the matched text on the corresponding page of the one or more documents;
   generating status predictions for the issue category by inputting, to one or more trained machine learning models, instances of input that correspond to the match instances, wherein each instance of input comprises at least (1) a portion of the matched text from the match instances, (2) distance and/or angle measurements extracted between the matched text and one or more of the associated symbols, and (3) one or more indicators representative of the associated symbols; and
   analyzing the status predictions to generate an overall status prediction for the issue category.

2. The method of claim 1, wherein the symbols associated with the matched text from the match instances comprise numerical values.

3. The method of claim 2, wherein the extracted measurements comprise one or more angles with respect to a) a location of the matched text of the match instances on the corresponding page of the one or more documents, and b) a location of one or more of the numerical values associated with the matched text on the corresponding page of the one or more documents.

4. The method of claim 1, wherein determining the matches is based on a Levenshtein distance between the text from a subset of the line items and the text descriptive of the issue category.

5. The method of claim 1, wherein the trained one or more machine learning models comprise one or more gradient boosted trees.

6. The method of claim 1, wherein the trained machine learning models are trained using real-world training instances comprising extracted features from one or more training documents and synthetic training instances.

7. The method of claim 6, wherein the real-world training instances and synthetic training instances comprise data labels, and the trained machine learning model is trained via supervised learning.

8. The method of claim 6, wherein the synthetic training instances comprise features that correspond to skewed, warped, or manipulated versions of the real-world training instances.

9. The method of claim 1, wherein the one or more documents comprise one or more vehicle loan documents and the overall status prediction corresponds to a coverage or liability for the vehicle loan documents.

10. The method of claim 9, wherein the issue category relates to gap coverage and the overall status prediction is a prediction about whether the vehicle loan documents comprises gap coverage.

11. A computer-readable storage medium storing instructions that, when executed by a computing system, cause the computing system to perform a process for resolving a latent status of one or more documents, that contain dense information, using machine learning, the process comprising:

receiving one or more documents comprising a plurality of line items, wherein the one or more documents are organized into pages;

determining match instances between text from a subset of the line items and text descriptive of an issue category;

extracting, for each of the match instances, one or more distance and/or angle measurements between: a) a location of the matched text of the match instance on a corresponding page of the one or more documents, and b) a location of symbols associated with the matched text on the corresponding page of the one or more documents;

generating status predictions for the issue category by inputting, to one or more trained machine learning models, instances of input that correspond to the match instances, wherein each instance of input comprises at least (1) a portion of the matched text from the match instances, (2) distance and/or angle measurements extracted between the matched text and one or more of the associated symbols, and (3) one or more indicators representative of the associated symbols; and analyzing the status predictions to generate an overall status prediction for the issue category.

12. The computer-readable storage medium of claim 11, wherein the symbols associated with the matched text from the match instances comprise numerical values.

13. The computer-readable storage medium of claim 12, wherein the extracted measurements comprise one or more angles with respect to a) a location of the matched text of the match instances on the corresponding page of the one or more documents, and b) a location of one or more of the numerical values associated with the matched text on the corresponding page of the one or more documents.

14. The computer-readable storage medium of claim 11, wherein determining the matches is based on a Levenshtein distance between the text from a subset of the line items and the text descriptive of the issue category.

15. The computer-readable storage medium of claim 11, wherein the trained one or more machine learning models comprise one or more gradient boosted trees.

16. The computer-readable storage medium of claim 11, wherein the trained machine learning models are trained using real-world training instances comprising extracted features from one or more training documents and synthetic training instances.

17. The computer-readable storage medium of claim 16, wherein the real-world training instances and synthetic training instances comprise data labels, and the trained machine learning model is trained via supervised learning.

18. The computer-readable storage medium of claim 11, wherein the one or more documents comprise one or more vehicle loan documents and the overall status prediction corresponds to a coverage or liability for the vehicle loan documents.

19. The computer-readable storage medium of claim 18, wherein the issue category relates to gap coverage and the overall status prediction is a prediction about whether the vehicle loan documents comprises gap coverage.

20. A computing system for resolving a latent status of one or more documents, that contain dense information, using machine learning, the computing system comprising:

one or more processors; and one or more memories storing instructions that, when executed by the one or more processors, cause the computing system to perform a process comprising:

receiving one or more documents comprising a plurality of line items, wherein the one or more documents are organized into pages;

determining match instances between text from a subset of the line items and text descriptive of an issue category;

extracting, for each of the match instances, one or more distance and/or angle measurements between: a) a location of the matched text of the match instance on a corresponding page of the one or more documents, and b) a location of symbols associated with the matched text on the corresponding page of the one or more documents;

generating status predictions for the issue category by inputting, to one or more trained machine learning models, instances of input that correspond to the match instances, wherein each instance of input comprises at least (1) a portion of the matched text from the match instances, (2) distance and/or angle measurements extracted between the matched text and one or more of the associated symbols, and (3) one or more indicators representative of the associated symbols; and analyzing the status predictions to generate an overall status prediction for the issue category.

* * * * *